US011895175B2

(12) United States Patent
Patel et al.

(10) Patent No.: US 11,895,175 B2
(45) Date of Patent: Feb. 6, 2024

(54) METHOD AND PROCESSING UNIT FOR CREATING AND RENDERING SYNCHRONIZED CONTENT FOR CONTENT RENDERING ENVIRONMENT

(71) Applicant: ZEALITY INC., Pleasanton, CA (US)

(72) Inventors: Dipak Mahendra Patel, Pleasanton, CA (US); Avram Maxwell Horowitz, San Francisco, CA (US); Karla Celina Varela-Huezo, San Francisco, CA (US)

(73) Assignee: ZEALITY INC, Pleasanton, CA (US)

( * ) Notice: Subject to any disclaimer, the term of this patent is extended or adjusted under 35 U.S.C. 154(b) by 0 days.

(21) Appl. No.: 17/723,488

(22) Filed: Apr. 19, 2022

(65) Prior Publication Data

US 2023/0336608 A1    Oct. 19, 2023

(51) Int. Cl.
*G06F 13/00* (2006.01)
*H04L 65/80* (2022.01)
*H04L 65/613* (2022.01)

(52) U.S. Cl.
CPC ............ *H04L 65/80* (2013.01); *H04L 65/613* (2022.05)

(58) Field of Classification Search
CPC .............................. H04L 65/80; H04L 65/613
USPC ............... 709/248, 231, 246, 227, 228, 230, 709/217–219; 715/230–233, 235, 715/808–810, 200, 255, 256
See application file for complete search history.

(56) References Cited

U.S. PATENT DOCUMENTS

| | | | |
|---|---|---|---|
| 7,664,872 B2 * | 2/2010 | Osborne ................. | H04L 65/65 370/324 |
| 10,226,703 B2 * | 3/2019 | De La Cruz .......... | A63F 13/537 |
| 10,300,390 B2 * | 5/2019 | De La Cruz .......... | A63F 13/537 |
| 10,873,774 B2 * | 12/2020 | Loheide ................ | H04L 65/752 |
| 11,316,912 B2 * | 4/2022 | Lapointe ................. | H04L 65/75 |
| 11,439,909 B2 * | 9/2022 | de la Cruz .............. | A63F 13/63 |
| 11,477,499 B2 * | 10/2022 | Loheide ........... | H04N 21/23614 |
| 11,477,500 B2 * | 10/2022 | Loheide ............. | H04N 21/8456 |
| 2006/0174021 A1 * | 8/2006 | Osborne ................. | H04L 65/65 709/230 |
| 2007/0248261 A1 | 10/2007 | Zhou et al. | |

(Continued)

FOREIGN PATENT DOCUMENTS

| | | |
|---|---|---|
| CN | 106534188 | 8/2019 |
| CN | 110795055 | 2/2020 |

*Primary Examiner* — Kenneth R Coulter
(74) *Attorney, Agent, or Firm* — Riyon Rae Harding

(57) ABSTRACT

A method and processing unit for creating and rendering synchronized content for content rendering environment are described in present disclosure. Initially, live content rendered to users in content receiving environment is received. Further, inputs from first user, and optionally from one or more second users is collected during rendering of live content. The inputs comprises user inputs provided in at least one of virtual environment and user actions in real-world environment. Inputs are collected along with at least one of corresponding time stamp and corresponding spatial stamp in content rendering environment. Upon collecting inputs, live content is synchronized with the inputs based on at least one of the time and spatial stamp, and context mapping of the inputs with segments of the live content to output a synchronized content. By rendering such synchronized content to the user, replication of live rendering of the content may be experienced by the user.

18 Claims, 13 Drawing Sheets

(56) References Cited

U.S. PATENT DOCUMENTS

| | | | |
|---|---|---|---|
| 2017/0282079 A1* | 10/2017 | De La Cruz | A63F 13/5375 |
| 2018/0296916 A1 | 10/2018 | Chung et al. | |
| 2020/0204834 A1* | 6/2020 | Loheide | H04N 21/26616 |
| 2021/0377331 A1* | 12/2021 | Lapointe | H04L 65/80 |

* cited by examiner

METHOD AND PROCESSING UNIT FOR CREATING AND RENDERING SYNCHRONIZED CONTENT FOR CONTENT RENDERING ENVIRONMENT

FIELD OF THE PRESENT DISCLOSURE

Embodiments of the present invention generally relate to rendering content to at least one user. In particular, embodiments of the present invention relate to a method and processing unit for creating and rendering synchronized content to at least one user for a content rendering environment.

BACKGROUND OF THE DISCLOSURE

Users may be rendered with content like video, audio, and images over a transmission medium such as the Internet. The user may connect to a content rendering environment to access the content. The content may be live content that is provided to the user via a user device. The live content may be immersive content, live streaming content, telecast content, gaming content, and so on. During rendering of the live content, in some content rendering environments, a user connected to the content rendering environment may be configured to provide one or more inputs via a corresponding user device. The one or more inputs may be at least one of voice inputs, text inputs, virtual reactions, real-world reactions, and so on. When a user provides an input, the inputs are dynamically provided along with the live content to the users connected to the content rendering environment. However, when a user opts for a replay mode of the live content, one or more inputs may not be part of the live content. Replay content therefore may not include one or more inputs of the users.

Conventional systems teach to collect one or more inputs and embed the inputs with the live content when replayed to a user. However, such replayed content may be cluttered with the one or more inputs. The inputs may be useful to the user and inputs which may be of interest to the user may be missed by the user in the replay mode.

Therefore, there is a need for a method and processing unit which synchronizes live content with one or more inputs using a timestamp and spatial stamp of the one or more inputs and by performing context mapping of the one or more inputs with segments of the live content.

The information disclosed in this background of the disclosure section is only for enhancement of understanding of the general background of the disclosure and should not be taken as an acknowledgment or any form of suggestion that this information forms existing information already known to a person skilled in the art.

BRIEF SUMMARY OF THE DISCLOSURE

A method, a processing unit, and a non-transitory computer-readable medium for creating and rendering synchronized content for a content rendering environment are described. The method includes receiving live content rendered to at least one user in a content rendering environment. Further, the method includes collecting one or more inputs from a first user of the at least one user, and optionally from one or more second users of the at least one user, during rendering of the live content. The one or more inputs comprises user inputs provided in at least one of a virtual environment and user actions in a real-world environment. The one or more inputs are collected along with a corresponding time stamp and corresponding spatial stamp in the content rendering environment. Upon collecting the one or more inputs, the method includes synchronizing the live content with the one or more inputs based on at least one of the time stamp and the spatial stamp of the one or more inputs, and context mapping of the one or more inputs with segments of the live content to output a synchronized content.

In an embodiment, the method further includes to rendering, when a replay mode of the live content is selected by a user, the synchronized content to the user.

In an embodiment, synchronizing the live content with the one or more inputs includes identifying matching inputs from the one or more inputs and correlating the matching inputs based on the similar context and the similar content. The matching inputs are associated with at least one of similar time stamp, similar spatial stamp, similar context, and similar content. Further, the matching inputs are modified based on the correlation, to output a modified input and the live content is synchronized with the modified input to output the synchronized content.

In an embodiment, correlating the matching inputs includes at least one of identifying missing content in an input from the matching inputs and identifying the matching inputs to be same.

In an embodiment, modifying the matching inputs based on the correlation includes at least one of combining contents of the matching inputs to include non-repetitive content in the modified input and altering at least one of the time stamp and the spatial stamp of the modified input, to synchronize the modified input with the live content.

In an embodiment, the synchronized content comprises plurality of layers. A first layer of the plurality of layers comprises the live content. Each of the other layers from the one or more layers comprises at least one input from the one or more inputs.

In an embodiment, the method further includes at least one of providing an option to a user to select at least one of the other layers, prior to rendering the synchronized content to the user and selecting at least one of the other layers, prior to rendering the synchronized content to the user, based on a user profile associated with the user. The user profile indicates preferences of the user.

In an embodiment, the inputs comprise at least one of voice inputs, text inputs, image inputs and video inputs.

The features and advantages of the subject matter described hereof will become more apparent in light of the following detailed description of selected embodiments, as illustrated in the accompanying FIGUREs. As one of ordinary skill in the art will realize, the subject matter disclosed is capable of modifications in various respects, all without departing from the scope of the subject matter. Accordingly, the drawings and the description are to be regarded as illustrative.

BRIEF DESCRIPTION OF THE DRAWINGS

The present subject matter will now be described in detail with reference to the drawings, which are provided as illustrative examples of the subject matter to enable those skilled in the art to practice the subject matter. It will be noted that throughout the appended drawings, features are identified by like reference numerals. Notably, the FIGUREs and examples are not meant to limit the scope of the present subject matter to a single embodiment, but other embodiments are possible by way of interchange of some or all of the described or illustrated elements and, further, wherein.

DETAILED DESCRIPTION OF THE EMBODIMENTS

Figure 1:
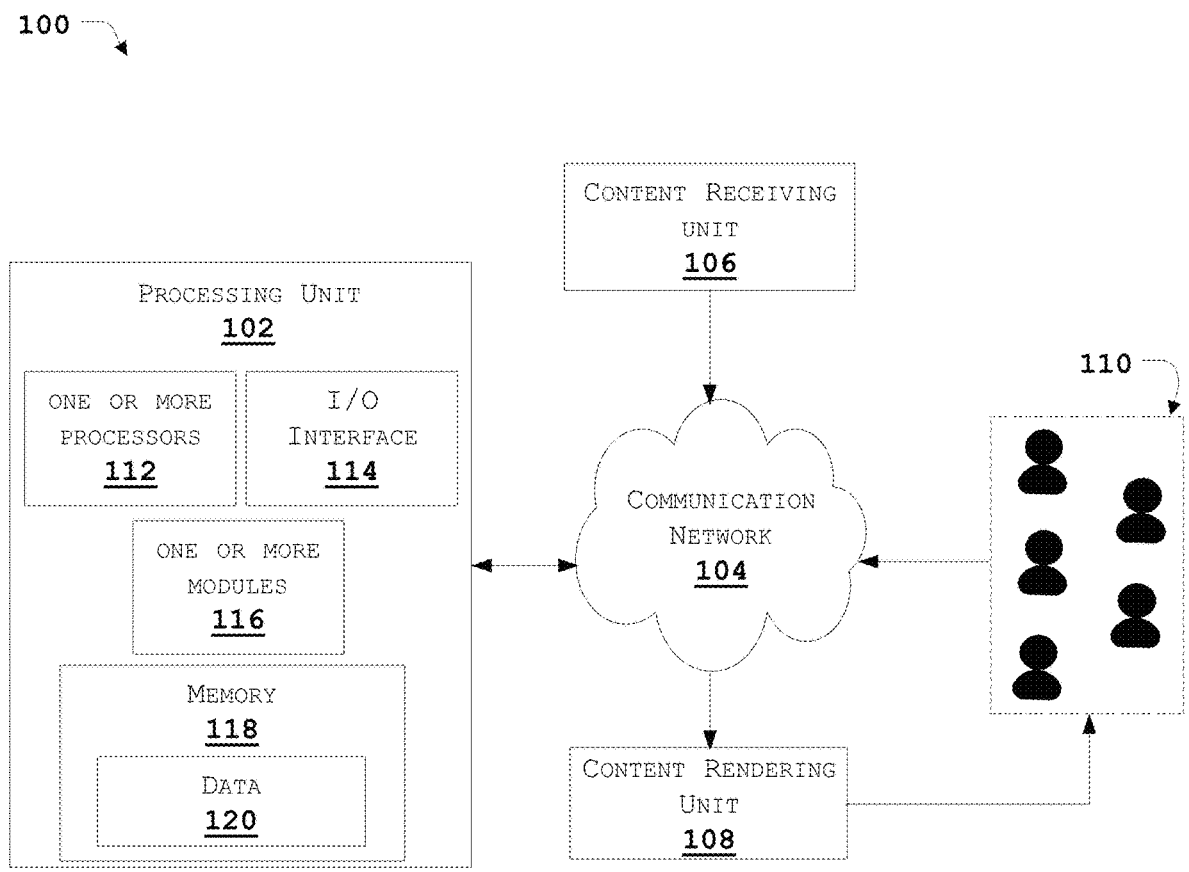
FIG. 1 illustrates an exemplary environment with processing unit for rendering content in a content rendering environment, in accordance with an embodiment of the present disclosure.

The detailed description set forth below in connection with the appended drawings is intended as a description of exemplary embodiments in which the presently disclosed process can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed method and system. However, it will be apparent to those skilled in the art that the presently disclosed process may be practiced without these specific details. In some instances, well-known structures and devices are shown in block diagram form in order to avoid obscuring the concepts of the presently disclosed method and system.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software and firmware.

Embodiments of the present invention may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, semiconductor memories, such as ROMs, PROMs, random access memories (RAMs), programmable read-only memories (PROMs), erasable PROMs (EPROMs), electrically erasable PROMs (EEPROMs), flash memory or other types of media/machine-readable medium suitable for storing electronic instructions (e.g., computer programming code, such as software or firmware).

Various methods described herein may be practiced by combining one or more machine-readable storage media containing the code according to the present invention with appropriate standard or customized computer hardware to execute the code contained therein. An apparatus for practicing various embodiments of the present invention may involve one or more computers (or one or more processors within the single computer) and storage systems containing or having network access to a computer program(s) coded in accordance with various methods described herein, and the method steps of the invention could be accomplished by modules, routines, subroutines, or subparts of a computer program product.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

It will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

Embodiments of the present disclosure relate to a method and processing unit for creating and rendering synchronized content for a content rendering environment. Live content that is rendered to at least one user is synchronized with one or more inputs provided by at least one user to output synchronized content. The one or more inputs may be provided by the at least one user during rendering of the live content. When a replay option of the content is selected by a user, the synchronized content is rendered to the user. By rendering such synchronized content, replication of rendering of live content may be experienced by the user. Also, the synchronized content created using the proposed method eliminates the cluttering and overlapping of the inputs on replay of the live content and includes inputs which are only relevant to the context and preferred to by a user. Also, the inputs which are to be replayed with the content may be as per preferences of the user to enhance the user experience.

FIG. 1 illustrates an exemplary environment 100 with processing unit 102 for creating and rendering synchronized content for a content rendering environment, in accordance with an embodiment of the present disclosure. As shown in FIG. 1, the exemplary environment 100 comprises the processing unit 102, a communication network 104, a content receiving unit 106, content rendering unit 108 and at least one user 110. Further, the exemplary environment 100 may be implemented within a user device connected to the content rendering environment. In an embodiment, the content rendering environment may be any environment which renders content to the at least one user 110. The content may be media including video, audio, images, and so on. Such environments may be an extended reality/immersive environment, a live-telecast environment, content streaming environment, visual communication based environment, online gaming environment and so on. The proposed processing unit 102 and method may be implemented in such environment which renders live content to the at least one user 110 and facilitates the at least one user 110 to provides one or more inputs during rendering of the live content. Also, the content rendering environment provisions the at least one user 110 with an option to playback the content that was previously rendered to the at least one user 110. In an embodiment, the at least one user 110 may be connected to the content rendering environment via user devices. The user devices may be at least one of a smartphone, a head mounted device, smart glasses, a television, a PC, tablet, laptop and so on. The content may be provided to the user devices to render to the at least one user 110. In an embodiment, each of the at least one user 110 may be associated with a dedicated user device. In an alternate embodiment, the at least one user 110 may be associated with a single user device. In an embodiment, the at least one user 110 may be associated with one or more user devices.

In an embodiment, the exemplary environment 100 may be implemented within a user device, connected to the content rendering environment, of each of the at least one user 110. In an embodiment, the processing unit 102 may be communicatively coupled with the user device. In such embodiment, the content receiving unit 106 and the content rendering unit 108 may be part of the user device. In an embodiment, the processing unit 102 along with the content receiving unit 106 and the content rendering unit 108 may be communicatively coupled with the user device. When there are multiple users connected with the content rendering environment, the exemplary environment 100 may be communicatively coupled with each of user devices associated with the multiple users. In an embodiment, the exemplary environment 100 may be implemented as a dedicated server associated with a single user device and communicatively coupled with other user devices connected with the content rendering environment. In an embodiment, the exemplary environment 100 may be implemented as cloud-based server communicated with each of the user devices. In an alternate embodiment, the processing unit 102 alone may be implemented as a dedicated server or a cloud based sever. In an alternate embodiment, the processing unit 102 along with at least one of the content receiving unit 106 and the content rendering unit 108 may be implemented as a dedicated server or a cloud based sever.

In an embodiment, the processing unit 102 is configured to create and render the synchronized content to at least one user 110. The processing unit 102 may be configured to function in real-time, when the at least one user 110 are viewing the content in the content rendering environment to create the synchronized content. When a playback option is selected by at least one user from the at least one user, the created synchronized content is rendered to at least the at least one user.

The at least one user 110 may view the content via one or more user devices. In an embodiment, each of the at least one user 110 may be associated with respective user device. In an alternate embodiment, the at least one user 110 may be associated with two or more user devices. For example, when the at least one user 110 comprises a presenter and one or more attendees, the presenter may be associated with a user device and the one or more attendees may be associated with at least one user device. The content rendered to the one or more user devices may be pre-defined or dynamically generated when rendering. During rendering of the content to the at least one user 110, at least one user devices associated with the at least one user 110 may be configured to provide one or more inputs. In an embodiment, the one or more inputs may be at least one of voice inputs, text inputs, image inputs and video inputs. For the given example, the one or more inputs may be comments from the one or more attendees during presentation of the presenter, reactions of the one or more attendees, additional comments or references provided by the presenter, digital notes, or physical notes of the attendees and so on. Consider a scenario of online gaming including one or more players. The voice comments, text comments, virtual reactions, real-world reactions of the one or more players may be considered to the one or more inputs. In an embodiment, the one or more inputs for each of the at least one user 110 may be received by their respective user devices.

The content, which is provided to the at least one user 110, along with the one or more inputs provided by the at least one user are simultaneously received by the content receiving unit 106. The content receiving unit 106 may be configured to provide the content and the one or more inputs to the processing unit 102. The content may be information that is to be rendered to the at least one user 110. The content may be a steaming video, immersive content, recorded video, virtual content, live content and so on. In an embodiment, the content receiving unit 106 may be part of the user device on which the content is displayed and one or more inputs are received. In an embodiment, the content receiving unit 106 may be the user device itself. In an alternate embodiment, the content receiving unit 106 may be integral part of the processing unit 102. In an embodiment, the content receiving unit 106 may function as a storage device, which temporally stores the content and the voice inputs. The stored content and the stored voice input may be communicated with the processing unit 102 dynamically, when received from the user device. In some non-limiting embodiments, the processing unit 102 may communicate with the content receiving unit 106 via the communication network 104. The communication network 104 may include, without limitation, a direct interconnection, a Local Area Network (LAN), a Wide Area Network (WAN), a wireless network (e.g., using Wireless Application Protocol), the Internet, and the like.

Using the content and the one or more inputs, the processing unit 102 is configured to output a synchronized content which is provided to at least one user, when the at least one user opts playback of the live content. In an embodiment, the synchronized content outputted by the processing unit 102 is received by the content rendering unit 108. The content rendering unit 108 may be in communication with the user devices associated with the at least one user 110. The content rendering unit 108 may render the synchronized content to at least one user from the at least one user 110 via corresponding user device. In an embodiment, the content rendering unit 108 may be integral part of the processing unit 102. In an alternate embodiment, the content rendering unit 108 may be integral part of user device to which the synchronized content is to be rendered. In such embodiment, each of the user devices associated with the at least one user 110 may include a dedicated content rendering unit 108. Thus, the processing unit 102 may be in communication with each of content rendering units associated with the user devices (not shown in figure). In an embodiment, the content rendering unit 108 may function as a storage device, which temporally stores the synchronized content. The stored synchronized content may be communicated with the user devices dynamically, when received from the processing unit 102. In some non-limiting embodiments, the processing unit 102 may communicate with the content rendering unit 108 via the communication network 104. The communication network 104 may include, without limitation, a direct interconnection, a Local Area Network (LAN), a Wide Area Network (WAN), a wireless network (e.g., using Wireless Application Protocol), the Internet, and the like.

In an embodiment, the processing unit 102 may communicate with the content receiving unit 106 and the content rendering unit 108 via a single communication network as shown in FIG. 1. In an alternate embodiment, the processing unit 102 may communicate with each of the content receiving unit 106 and the content rendering unit 108 via a dedicated communication network (not shown in Figures).

Figure 2:
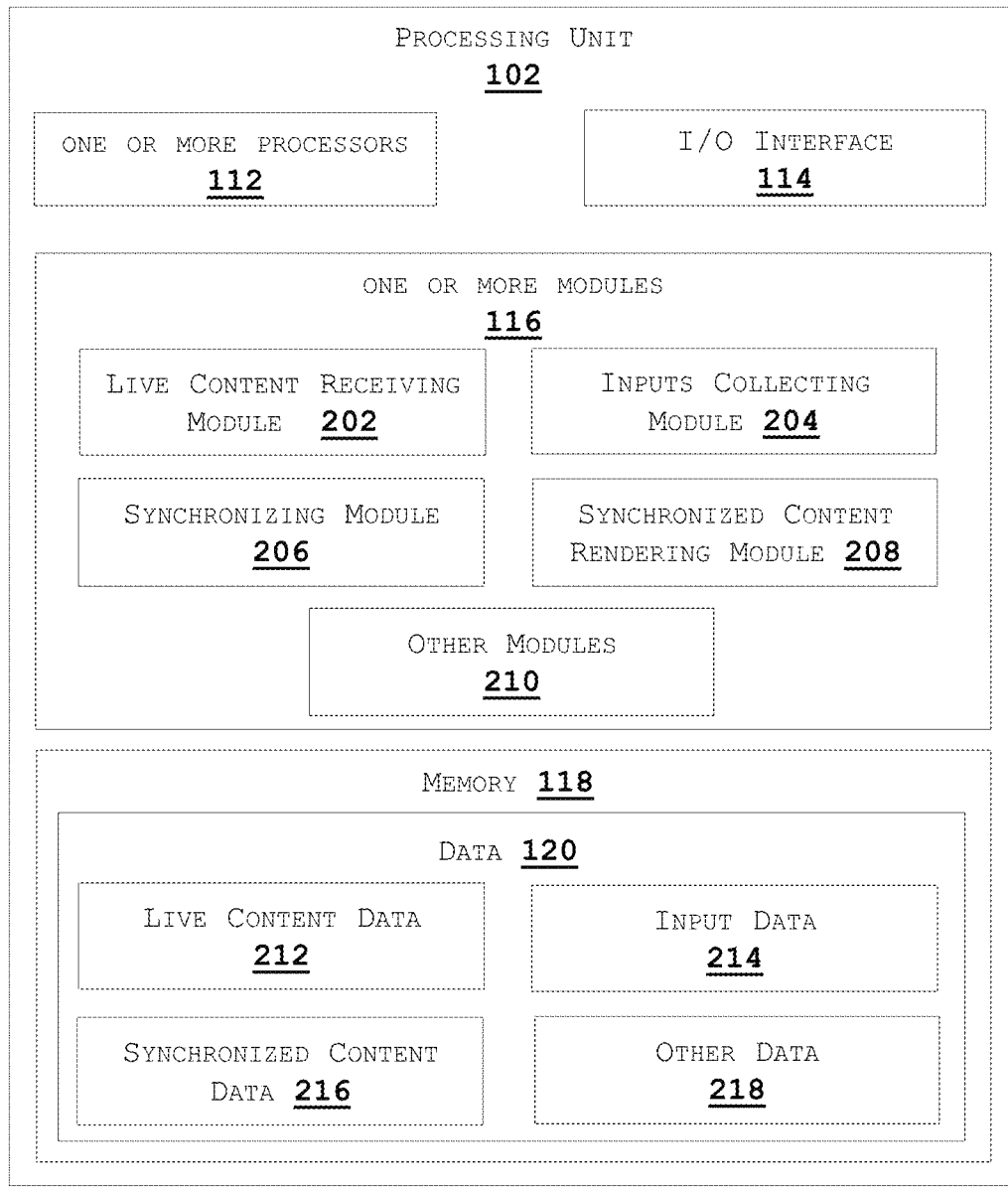
FIG. 2 illustrates a detailed block diagram showing functional modules of a processing unit for creating and rendering synchronized content for a content rendering environment, in accordance with an embodiment of the present disclosure.

FIG. 2 shows a detailed block diagram of the processing unit 102 for rendering content in the content rendering environment, in accordance with some non-limiting embodiments or aspects of the present disclosure. The processing unit 102 may include one or more processors 112, an Input/Output (I/O) interface 114, one or more modules 116 and a memory 118. In some non-limiting embodiments or aspects, the memory 118 may be communicatively coupled to the one or more processors 112. The memory 118 stores instructions, executable by the one or more processors 112, which on execution, may cause the processing unit 102 to create and render the synchronized content in the content rendering environment. In some non-limiting embodiments or aspects, the memory 118 may include data 120. The one or more modules 116 may be configured to perform the steps of the present disclosure using the data 120 to create and render the synchronized content. In some non-limiting embodiments or aspects, each of the one or more modules 116 may be a hardware unit, which may be outside the memory 118 and coupled with the processing unit 102. In some non-limiting embodiments or aspects, the processing unit 102 may be implemented in a variety of computing systems, such as a laptop computer, a desktop computer, a Personal Computer (PC), a notebook, a smartphone, a tablet, e-book readers, a server, a network server, a cloud server, and the like. In a non-limiting embodiment, each of the one or more modules 116 may be implemented with a cloud-based server, communicatively coupled with the processing unit 102.

The data 120 in the memory 118, and the one or more modules 116 of the processing unit 102 are described herein in detail. In one implementation, the one or more modules 116 may include, but is not limited to, a live content receiving module 202, an inputs collecting module 204, a synchronizing module 206, a synchronized content rendering module 208, and one or more other modules 210 associated with the processing unit 102. In some non-limiting embodiments or aspects, the data 120 in the memory 118 may include live content data 212 (herewith also referred to as live content 212), input data 214 (herewith also referred to as one or more inputs 214), synchronized content data 216 (herewith also referred to as synchronized content 216), and other data 218 associated with the processing unit 102.

In some non-limiting embodiments or aspects, the data 120 in the memory 118 may be processed by the one or more modules 116 of the processing unit 102. In some non-limiting embodiments or aspects, the one or more modules 116 may be implemented as dedicated units and when implemented in such a manner, the modules may be configured with the functionality defined in the present disclosure to result in a novel hardware. As used herein, the term module may refer to an Application Specific Integrated Circuit (ASIC), an electronic circuit, Field-Programmable Gate Arrays (FPGA), a Programmable System-on-Chip (PSoC), a combinational logic circuit, and/or other suitable components that provide the described functionality. The one or more modules 116 of the present disclosure function to control the access to the virtual and real-world environment. The one or more modules 116 along with the data 120, may be implemented in any system for creating and rendering the synchronized content 216 to the at least one user in the content rendering environment.

For rendering the content in the content rendering environment, the live content receiving module 202 may be configured to receive the live content 212 rendered to the at least one user 110. The live content 212 is data or information that is provided to the at least one user 110 in the content rendering environment. The live content 212 may be an immersive content, augmented content, streaming content, and so on. For example, consider the content rendering environment is an online classroom environment with lecturer and students as the at least one user 110. Display viewed by the one or more students during lecture provided by the lecturer may be the live content 212 rendered to the one or more students. Consider the content rendering environment is live telecast of football game and the at least one user 110 are viewers of the live telecast. The display of game provided to the viewers may be considered as the live content 212. Consider another example where the content rendering environment is an online gaming platform and one or more players of a game in the online gaming platform are the at least one user 110. In such environment, display of the game controlled by the one or more players may be considered as the live content 212. The live content 212 of the content rendering environment may vary based on application. In an embodiment, the live content receiving module 202 may be configured to receive the live content 212 dynamically when the live content 212 is rendered to the at least one user 110. In an embodiment, the live content receiving module 202 may be coupled with the user device in which the live content 212 is rendered, to receive the live content 212. In an alternate embodiment, the live content receiving module 202 may be in communication with servers which generate the live content 212, to receive the live content 212.

When receiving the live content 212, the inputs collecting module 204 may be configured to collect the one or more inputs 214 provided by at least one user from the at least one user 110 during rendering of the live content 212. The one or more inputs 214 may be at least one of voice inputs, text inputs, image inputs and video inputs provided by the at least one user. The one or more inputs may be provided by the at least one users using corresponding user devices. In an embodiment, the one or more inputs 214 may be provided in virtual environment or in real-world environment. The one or more inputs from a user may be collected by corresponding user device and communicated with the inputs collecting module 204. The inputs collecting module 204 may be configured to receive the one or more inputs 214 along with at least one of corresponding time stamp and corresponding spatial stamp in the content rendering environment. The time stamp of an input from the one or more inputs 214 indicate time at which the input was provided by the at least one user. The spatial stamp of the input may indicate the spatial orientation of the input on the display of the live content 212. In an embodiment, the user devices associated with the content rendering environment may implement the one or more timestamping and spatial stamping techniques to time-stamp and spatial stamp the one or more inputs 214 provided by the at least one user. The inputs collecting module 204 may collect the one or more inputs 214 along with corresponding timestamp and corresponding spatial stamp from the user devices. In an alternate embodiment, the inputs collecting module 204 may be implemented in the user device and communicatively coupled with the processing unit 102. In such embodiment, the inputs collecting module 204 may use one or more time stamping and spatial stamping techniques to time stamp and spatial stamp the one or more inputs 214.

Consider the content rendering environment is the online classroom environment with the lecturer and the students as the at least one user 110. Additional references provided by the lecturer may be the one or more inputs 214. Text comments and virtual reactions, provided in the virtual environment by the students during the lecture, may be considered as the one or more inputs 214. Voice comments and real-world reactions provided by the students in the real-world environment may be considered as the one or more inputs 214. Digital notes in the virtual environment and physical notes in the real-world environment, taken by the students, during the lecture, may be considered as the one or more inputs 214. Consider the content rendering environment is the live telecast of a football game and the at least one user are commentator and one or more viewers of the live telecast. Comments provided by the commentator of the football game may be considered as the one or more inputs 214. Consider another example where the content rendering environment is the online gaming platform and the one or more players of the game are the at least one user. In such environment, text comments, reactions in virtual and real-world environments and voice comments of the one or more players may be considered as the one or more inputs 214. In an embodiment, the inputs collecting module 204 may be configured to receive the one or more inputs 214 dynamically when the one or more inputs 214 are provided by the at least one user. In an embodiment, the inputs collecting module 204 may be coupled with a user device in which the inputs are provided by the corresponding at least one user associated with the user device. In an alternate embodiment, the inputs collecting module 204 may be implemented as a centralized module in communication with each of the user devices associated with the at least one user. Such centralized module may be configured to collect the one or more inputs 214 from each of the user devices. In an embodiment, the one or more inputs 214 may be collected using servers which generate the live content 212, to receive the live content 212. In an embodiment, the one or more inputs 214 may include virtual inputs and real-world inputs. The virtual inputs may be virtual reactions, text inputs, digital notes and so on. The real-world inputs may be voice inputs, physical notes, user actions, facial reactions and so on. In an embodiment, the virtual inputs may be collected by tracking the display screen rendering the live content 212. In an embodiment, the real-world inputs may be collected using one or more sensors associated with the user devices. The one or more sensors may include a camera, a microphone and so on. The physical notes, user actions and so on may be collected using the camera. The voice inputs may be collected using microphone.

Figure 3A:
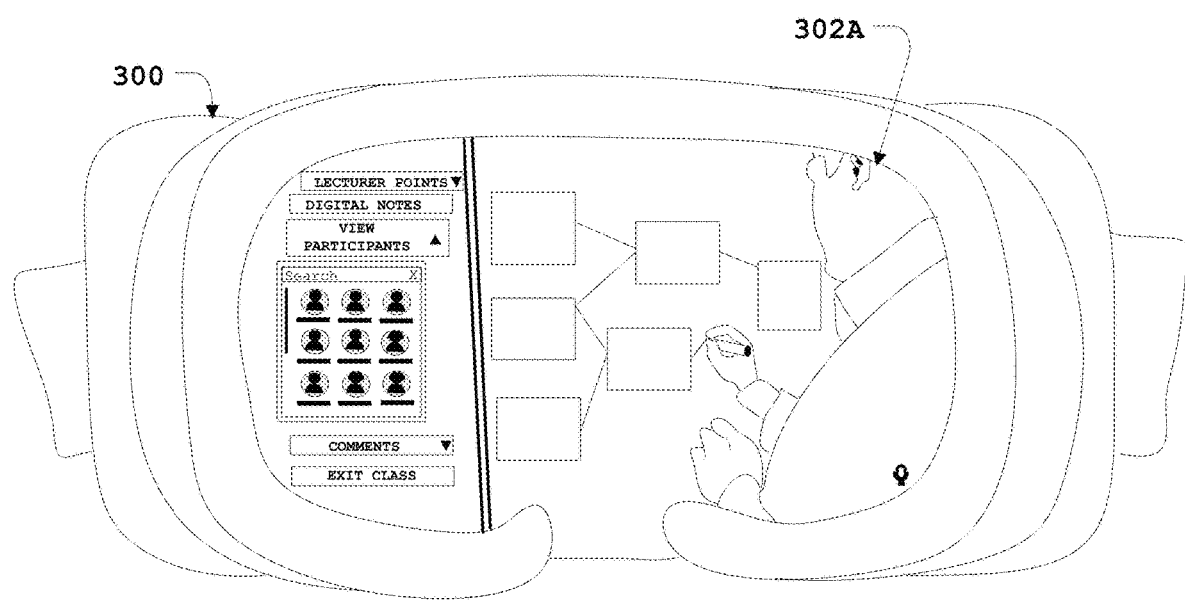
FIGS. 3A-3F show exemplary embodiments for creating and rendering synchronized content for a content rendering environment, in accordance with an embodiment of the present disclosure.
Figure 3B:
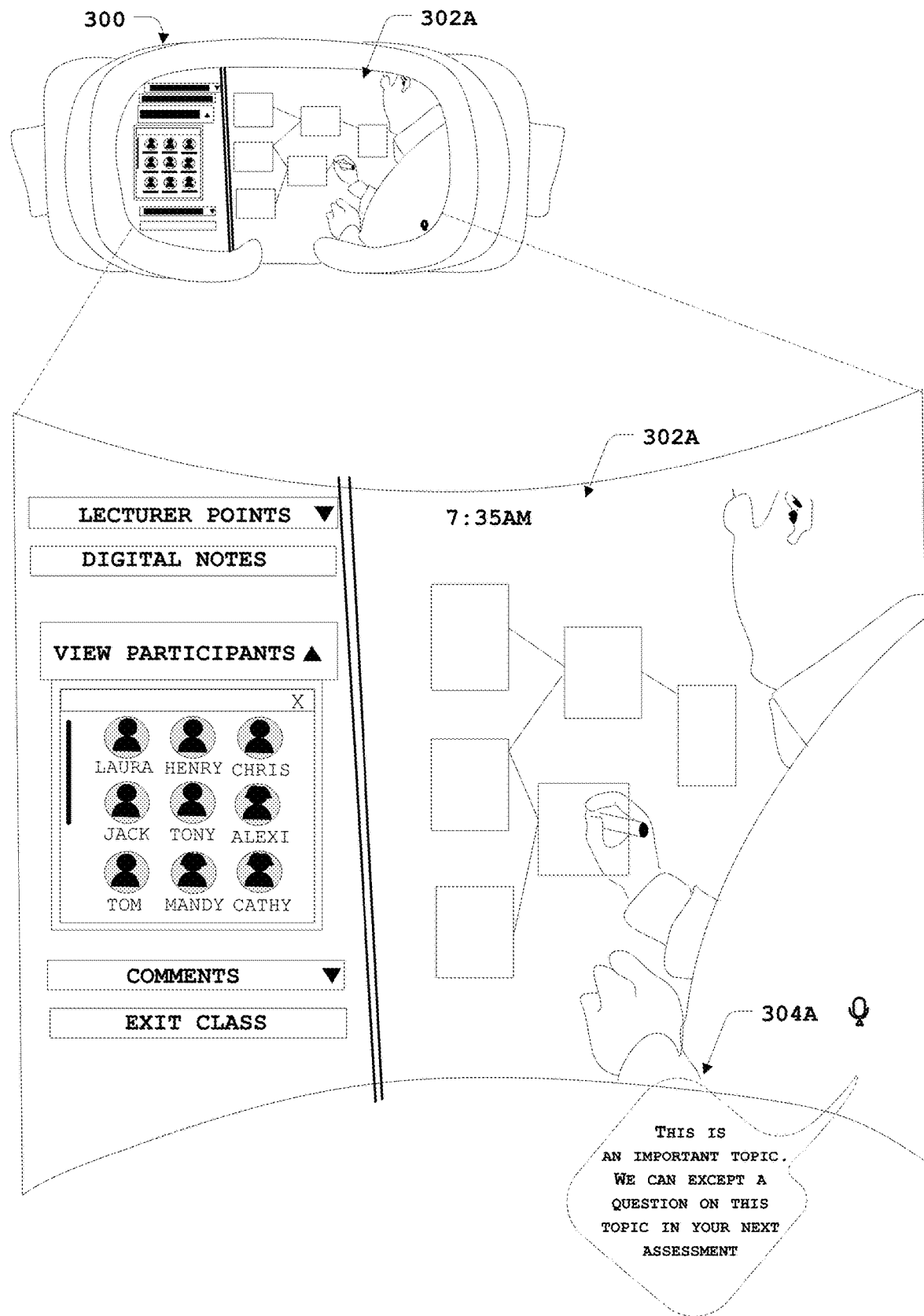
Figure 3C:
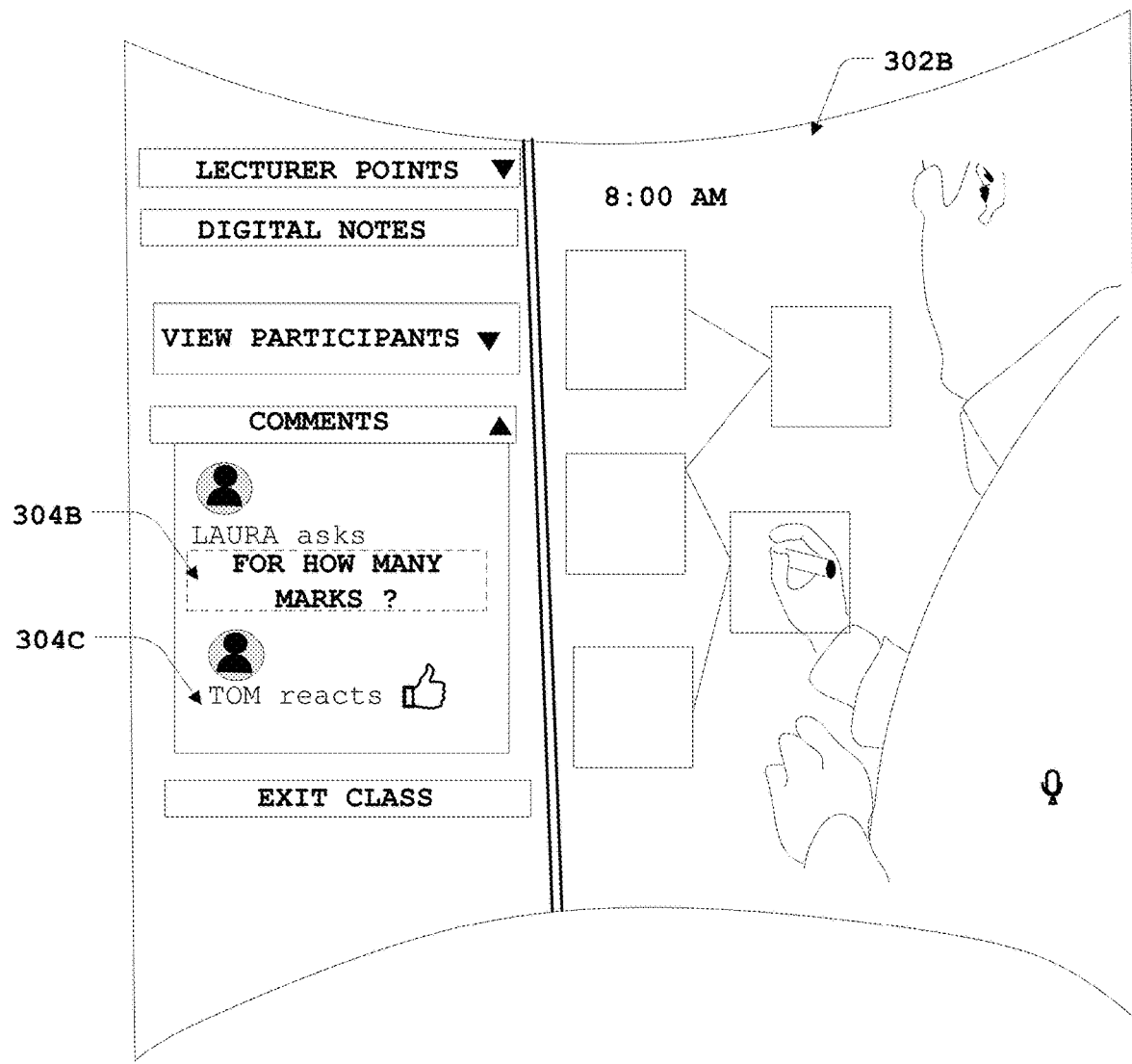
Figure 3D:
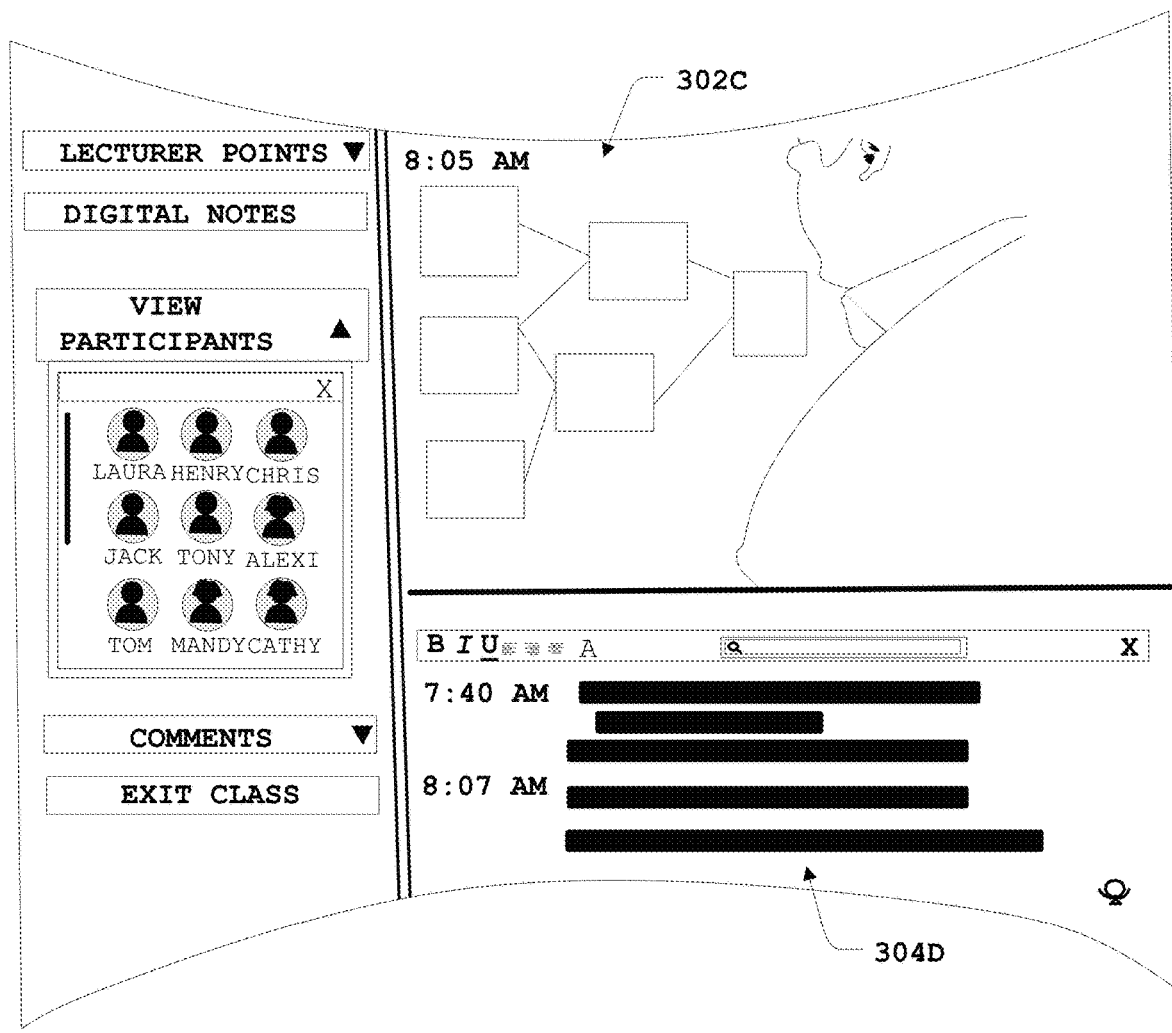
Figure 3E:
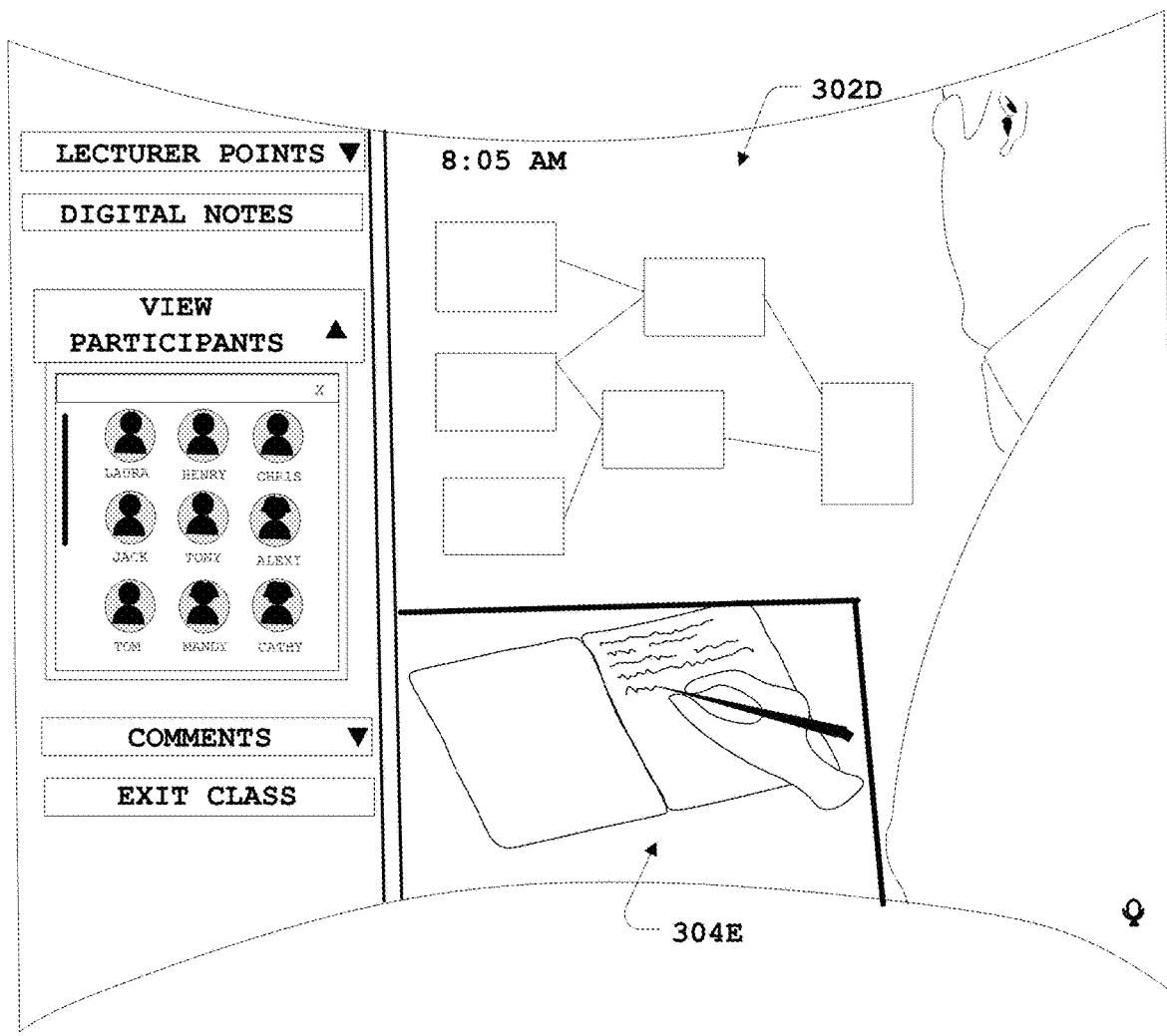

In the embodiment illustrated in FIG. 3A, the content rendering environment is an immersive classroom environment in which immersive content is rendered to a user wearing a Head Mounted Display (HMD) 300. The immersive content may be a 360° view of a classroom with a lecturer and plurality of students. In an embodiment, the 360° view may be a view of the live content (also referred to as an immersive content) rendered to the at least one user. Each of the students may be wearing the HMD to access the live content i.e., immersive classroom content. The display rendered to the HMD may be considered as the live content. The live content may be plurality of frames rendered sequentially to the student wearing the HMD. An exemplary frame of the live content is shown as frame 302A. In an embodiment, when the live content is rendered to the students, simultaneously, the live content receiving module 202 may be configured to receive the live content. In an alternate embodiment, the live content may be stored in a memory associated with a user device to which the live content is rendered and the live content receiving module 202 may receive such pre-stored live content. In an embodiment, along with the live content, the inputs collecting module 204 may be configured to collect the inputs provided by the lecturer and the students. Consider FIG. 3B where the live content at an instant of time i.e., 7:35AM is illustrated as the frame 302A. The live content receiving module 202 may be configured to receive each of the plurality of frames of the live content. Consider, at 7:35AM, the lecture provides a voice input as "THIS IS AN IMPORTANT TOPIC. WE CAN EXPECT A QUESTION ON THIS TOPIC IN YOUR NEXT ASSESMENT". Such comment is an additional reference which is not part of the live content. The inputs collecting module 204 may collect the voice input from the lecture as first input 304A with time stamp of 7:35AM. Further, as shown in FIG. 3c, consider at 8:00AM in frame 302B, first student includes a comment saying, "FOR HOW MANY MARKS?". Also, at the same time, a second student provides a thumbs up reaction. The inputs from the first student and the second student are also collected as second input 304B and third input 304C, respectively, by the inputs collecting module 204 with time stamp of 8:00AM and corresponding spatial stamp. Consider at 8:05AM in frame 302C, a third student starts to make digital notes on the important topic, as shown in FIG. 3D. The digital notes of the third student may be collected as fourth input 304D by the inputs collecting unit with time stamp of 8:05AM. Simultaneously, a fourth student starts to make physical notes on the important topic, as shown in FIG. 3E in frame 302D. The physical notes of the fourth student may be collected as fifth input 304E by the inputs collecting unit with time stamp of 8:05AM. For the illustrated embodiment, the first input 304A, the second input 304B, the third input 304C, the fourth input 304D and the fifth input 304E may be collected to be the one or more inputs 214.

Upon receiving the live content 212 and collecting the one or more inputs 214, the synchronizing module 206 of the processing unit 102 may be configured to synchronize the live content 212 with the one or more inputs 214. The synchronization is based on at least one of the time stamp and the spatial stamp of the one or more inputs 214. The synchronizing module 206 is further configured to perform context mapping of the one or more inputs 214 with segments of the live content 212. The synchronizing module 206 synchronizes the live content 212 with the one or more inputs 214 to output a synchronized content 216. The synchronized content 216 may include the live content 212 embedded with at least one input from the one or more inputs 214.

In an embodiment, the context mapping of the one or more inputs 214 with the segments of the live content 212 may be performed using Natural language processing (NLP) techniques. By context mapping, context of the live content 212 at every instant of time is derived and stored in the memory. Further, context of each of the one or more inputs 214 collected along with the live content 212 is derived and stored in the memory. The context of the live content 212 at every instant of time and the context of each of the one or more inputs 214 is used to output the synchronized content 216. One or more techniques, known to a person skilled in the art, may be used to derive the context of the live content 212 and the one or more inputs 214.

In an embodiment, the live content 212 is synchronized with the one or more inputs 214 by identifying matching inputs from the one or more inputs 214. The matching inputs are associated with at least one of similar time stamp, similar spatial stamp, similar context, and similar content. Further, the matching inputs are correlated based on the similar context and the similar content. In an embodiment, correlating the matching inputs may be performed by identifying missing content in an input from the matching inputs or identifying the matching inputs to be same. Further, upon the correlation, the matching inputs are modified based on the correlation, to output a modified input. In an embodiment, the matching inputs are modified based on the correlation by combining contents of the matching inputs to include non-repetitive content in the modified input and altering at least one of the time stamp and the spatial stamp of the modified input, to synchronize the modified input with the live content 212. Upon the modification, the live content 212 is synchronized with the modified input to output the synchronized content 216.

Figure 3F:
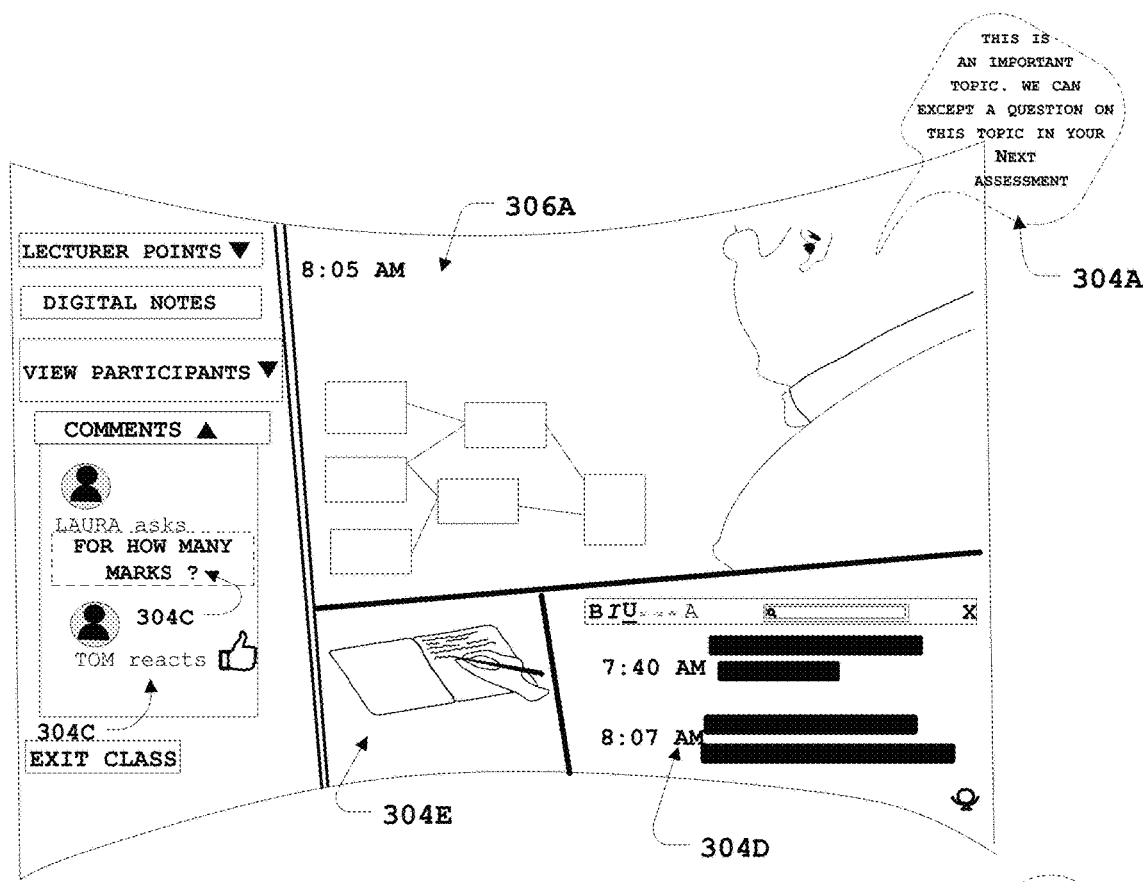
Figure 3F:
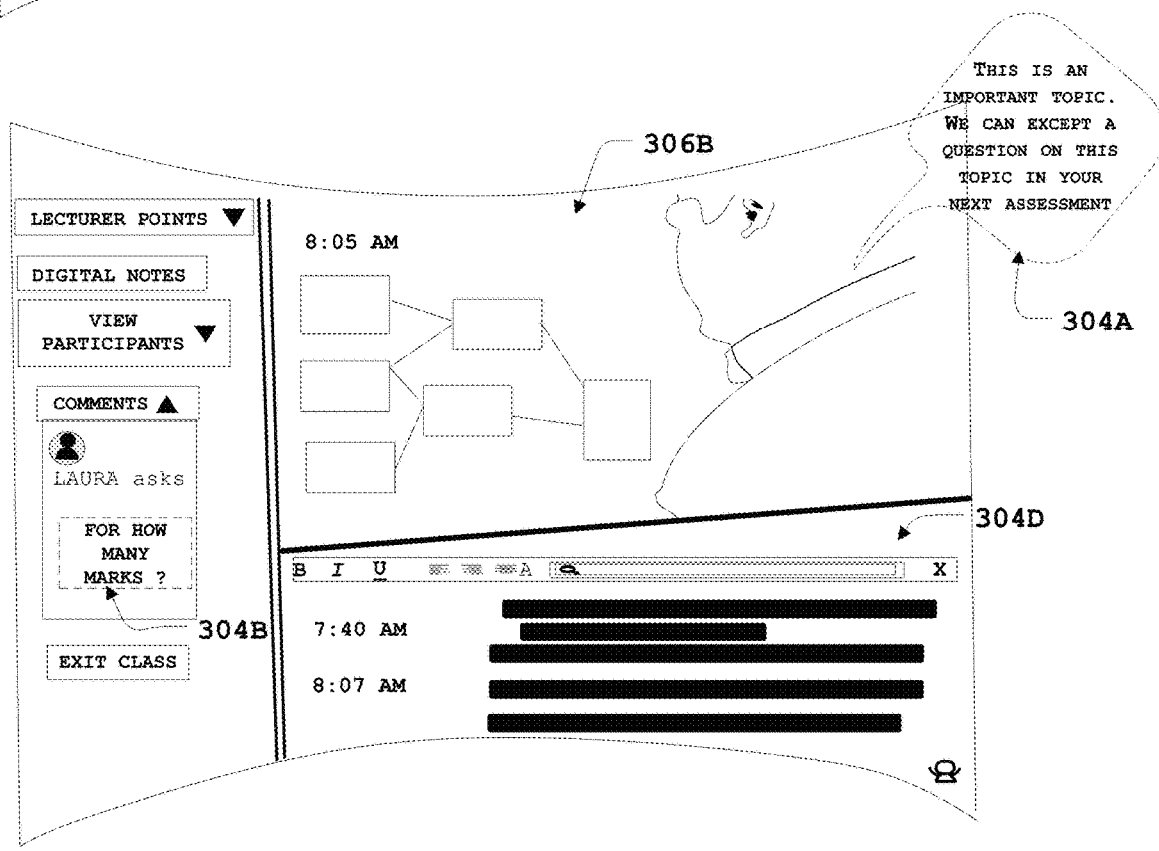

In the embodiment illustrated in FIGS. 3B-3E, the live content of the lecture is received and the one or more inputs including the first input 304A, the second input 304B, the third input 304C, the fourth input 304D and the fifth input 304E are collected. The one or more inputs are received at 7:35AM, 8:00AM and 8:05AM. The context of the live content is derived at every instant of time to output the synchronized content 216. Similarly, the context of the one or more inputs are derived to correctly embed an input with at least one of appropriate time stamp and appropriate spatial stamp. Exemplary representation of frames of the synchronized content 216 is shown as frames 306A and 306B in FIG. 3F. The frames 306A and 306B include the live content embedded with the one or more inputs. The context of each of the first input 304A, the second input 304B, the third input 304C, the fourth input 304D and the fifth input 304E may be matching with the context of the live content at 8:05AM. Context of the first input 304A may be derived to relating to an important topic which was narrated at 7:35AM. The context of the second input 304B and the third input 304C is also related to the important topic. Content of the fourth input 304D and the fifth input 304E is used to derive corresponding context. Consider the content is related to the important topic. Thus, the context of the fourth input 304D and the fifth input 304E is related to the important topic. Since the context of the first input 304A, the second input 304B, the third input 304C, the fourth input 304D and the fifth input 304E are similar. The first input 304A, the second input 304B, the third input 304C, the fourth input 304D and the fifth input 304E may be considered to the matching inputs. Upon identifying the matching inputs, the matching inputs are correlated to identify missing content in any of the first input 304A, the second input 304B, the third input 304C, the fourth input 304D and the fifth input 304E. Further, the first input 304A, the second input 304B, the third input 304C, the fourth input 304D and the fifth input 304E correlated to check if any of the first input 304A, the second input 304B, the third input 304C, the fourth input 304D and the fifth input 304E are same. Upon correlation, the first input 304A, the second input 304B, the third input 304C, the fourth input 304D and the fifth input 304E are modified. Thus, the frame 306A may be outputted as a frame in the synchronized content 216. Consider the fourth input 304D and the fifth input 304E include same content. In such case, one of the fourth input and the fifth input may be not embedded with the live content. Consider the content in the fourth input 304D is not complete. Another input which similar content which is complete may be used and the fourth content 304D may be not embedded with the live content. In an alternate embodiment, the fourth input 304D may be modified to included digital notes which was collected at 8:07AM include relevant content in the fourth input 304D, as shown in FIG. 3F. Further, at least one of the time stamp and the spatial stamp of the first input 304A, the second input 304B, the third input 304C, the fourth input 304D and the fifth input 304E are modified to embed with live content with similar context. In the illustrated embodiment, the time stamp of the first input 304A, the second input 304B, the third input 304C are modified and are embedded with the live content at 8:05AM, as shown in the frame 306A. Similarly, the spatial stamping of the fourth input 304D and the fifth input 304E are modified to and are embedded with the live content at 8:05AM, as shown in the frame 306A.

In an embodiment, the synchronized content 216 comprises plurality of layers. A first layer of the plurality of layers may include the live content 212 and each of other layers from the one or more layers may include at least one input from the one or more inputs. For example, in the embodiment illustrated in FIG. 3F, the live content of the lecture at 8:05AM may be the first layers. Each of the first input 304A, the second input, the third input, the fourth input and the fifth input may be the other layers of the synchronized content 216.

When a replay mode of the live content 212 is selected by a user, the synchronized content rendering module 208 may be configured to render the synchronized content 216 to the user via the content rendering module 108. In an embodiment, a module from the one or more other modules 116 may be configured to provide an option to the user to select at least one of the other layers, prior to rendering the synchronized content 216 to the user. In an embodiment, a module from the one or more modules may be configured to select at least one of the other layers, prior to rendering the synchronized content 216 to the user, based on a user profile associated with the user. In an embodiment, the user profile indicates preferences of the user. For example, in the embodiment illustrated in FIG. 3F, during replay of the live content, at 8:05AM of the live content, the synchronized content 216 may be as shown in the frame 306A. Consider, the user to whom the synchronized content 216 is rendered does not prefer to view physical notes. With the option to choose the layers, consider the user opts to eliminate the reactions of the other users. In such case the third input 304C may be eliminated in the frame 304E. In such case, the outputted frame may be the frame 306B.

Figure 4:
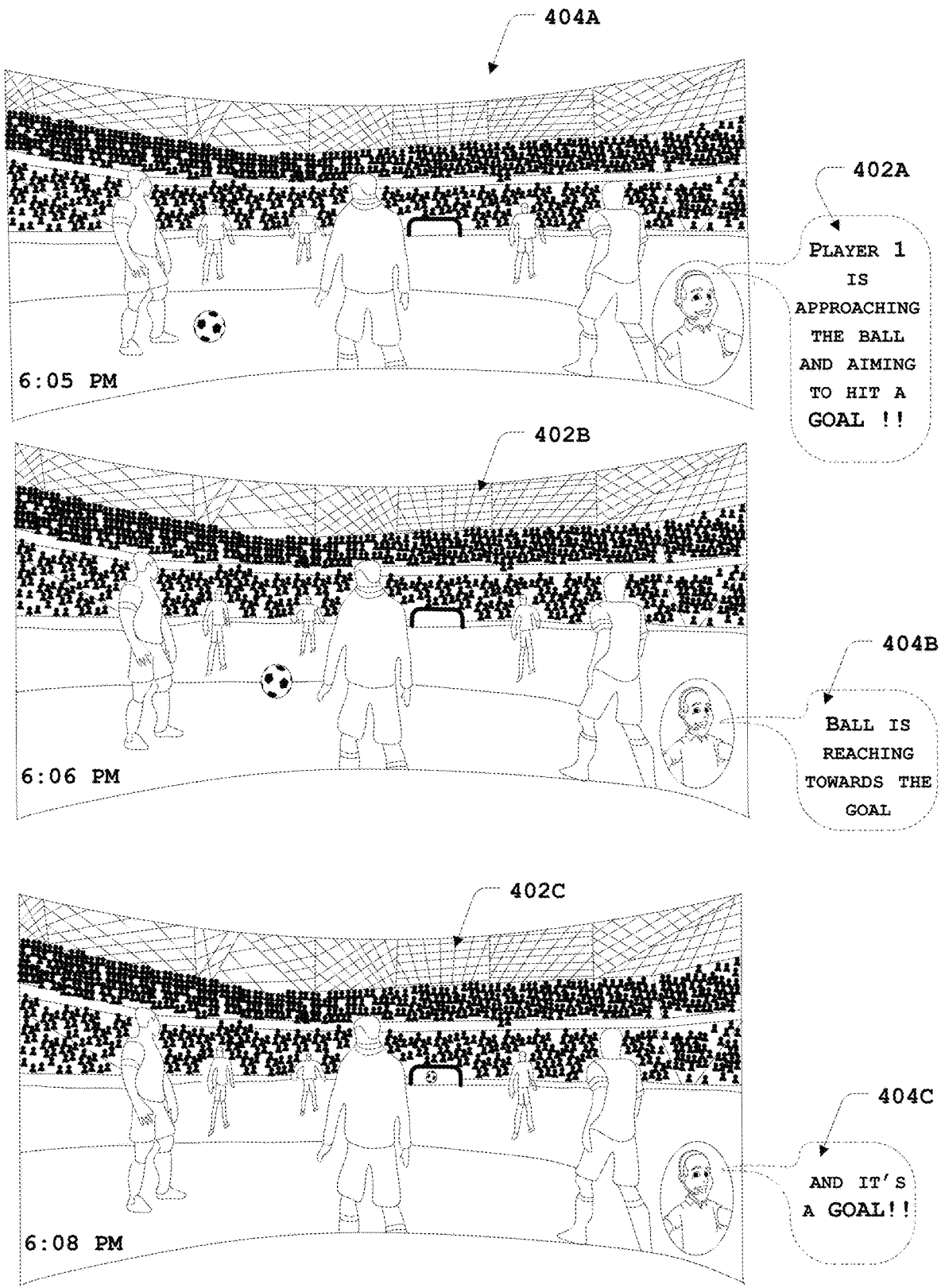
FIG. 4 shows an exemplary embodiment for creating and rendering synchronized content for a content rendering environment, in accordance with an embodiment of the present disclosure.

Consider the content rendering environment is a live telecast of a football game as shown in FIG. 4. The comments provided by a commentator of the football game may be recorded and synched with the live content when replayed. The replayed content may include frames 402A, 402B and 402C. The inputs from the commentator are appropriately embedded with the frames 402A, 402B and 402C. In an embodiment, even when the commentator provides comments with delay. When synching the live content with the one or more inputs from the commentator, time stamp of the comments are modified to correctly embed with live content with similar context.

Figure 5:
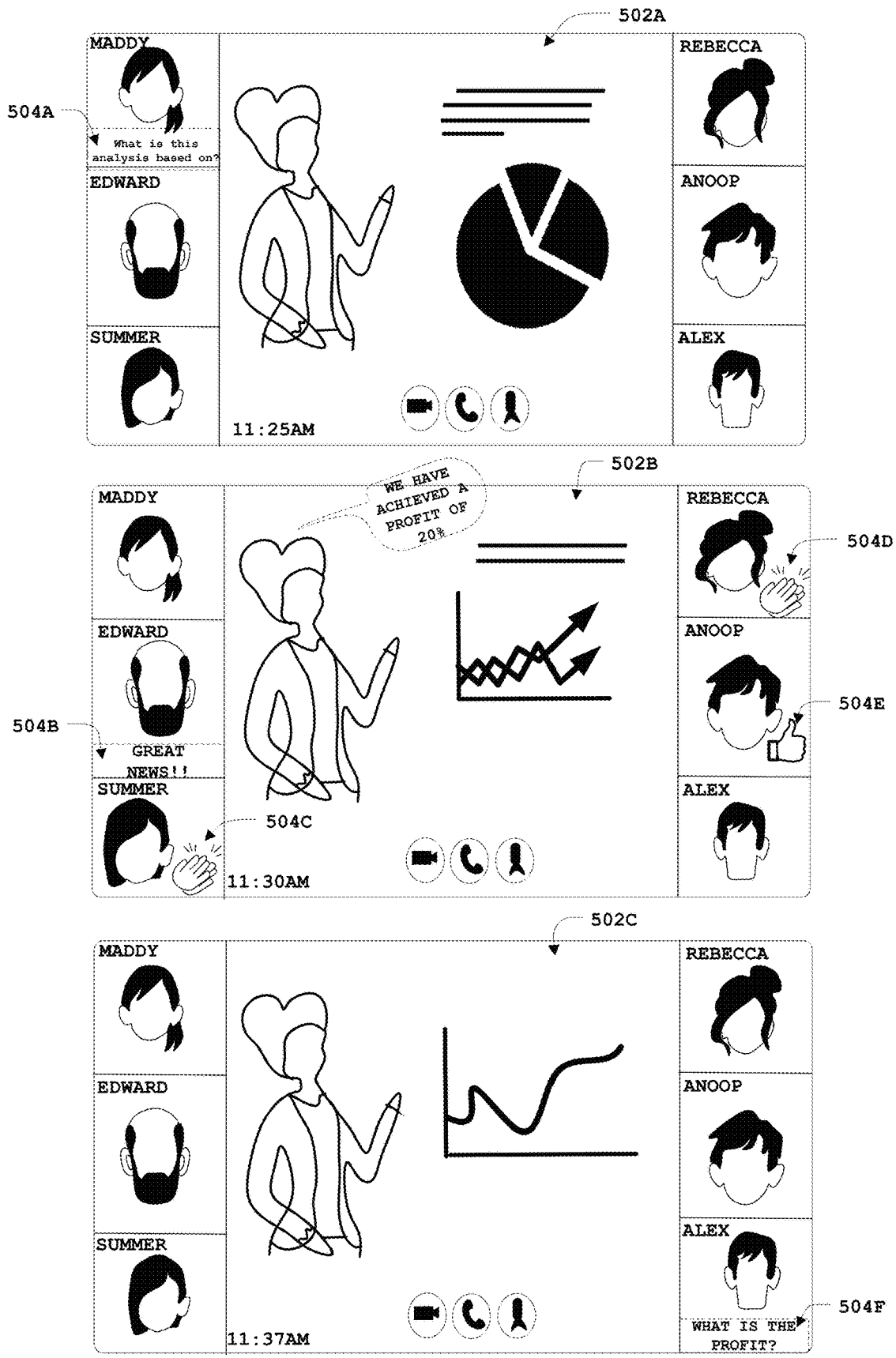
FIGS. 5 and 6 show exemplary embodiments for creating and rendering synchronized content for a content rendering environment, in accordance with an embodiment of the present disclosure.
Figure 6:
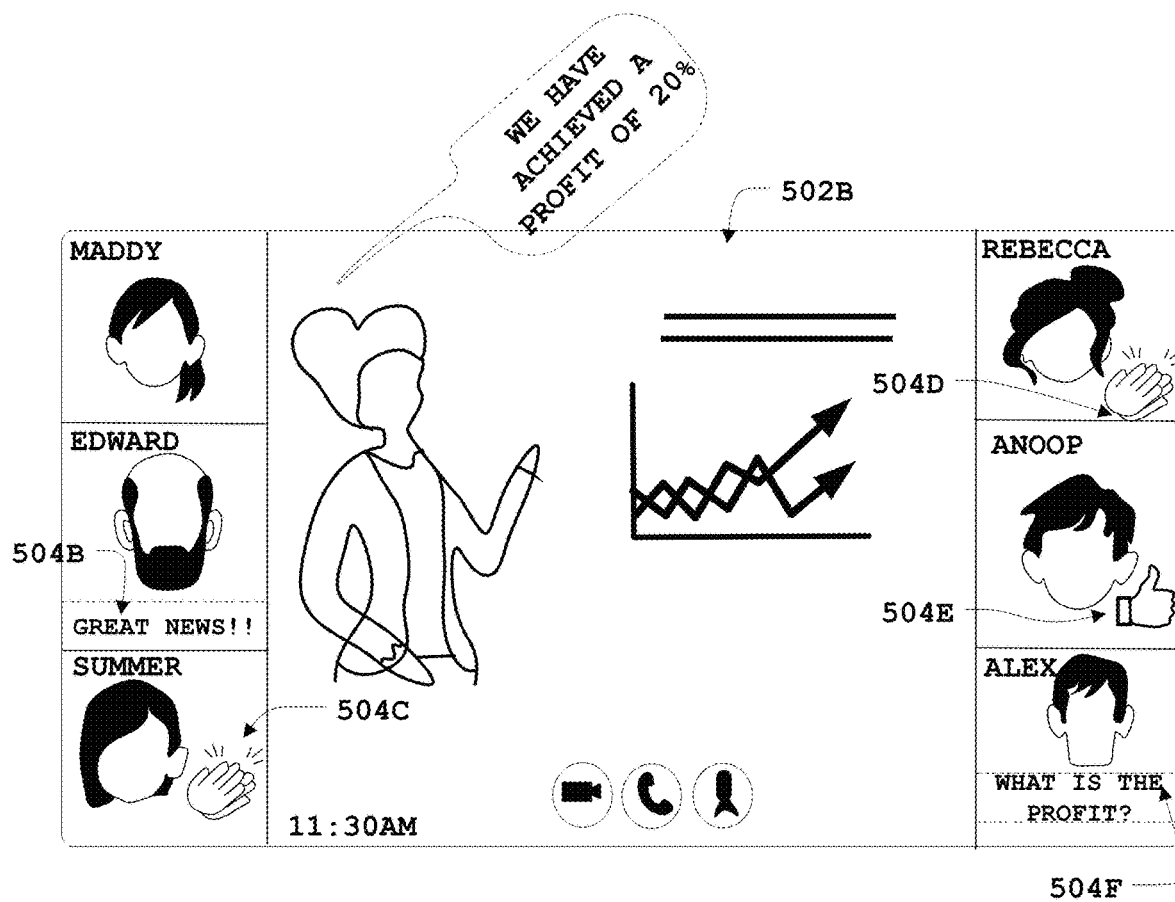

Consider the content rendering environment is an online presentation with a presenter and one or more attendees. Each of the attendees may use dedicated user device to access the presentation in real-time. The live content may be plurality of frames rendered sequentially to the one or more attendees. Exemplary frames of the live content are shown as frames 502A, 502B and 502C in FIG. 5. In an embodiment, when the live content is rendered to the attendees, simultaneously, the live content receiving module 202 may be configured to receive the live content. In an embodiment, the live content may be recorded during rendering in real-time. Upon completion of the rendering of the live content, the recorded content may be received by the live content receiving module 202. Consider, at 11:25 AM, a first attendee provides a text input as "WHAT IS THE ANALYSIS BASED ON?". The inputs collecting module 204 may collect the text input from the first attendee as first input 504A with time stamp of 11:27AM. Further, at 11:30AM, a second attendee includes a comment saying, "GREAT NEWS". The inputs collecting module 204 may collect the text input from the second attendee as second input 504B with time stamp of 11:30AM. At same instant of time, a third attendee, a fourth attendee and a fifth attendee may provide virtual reactions. The inputs collecting module 204 may collect the virtual reactions from the third attendee, the fourth attendee and the fifth attendee as third input 504C, fourth input 504D and fifth input 504E with time stamp of 11:30AM. At 11:37AM, a sixth attendee includes a comment saying, "WHAT IS THE PROFIT". The inputs collecting module 204 may collect the text input from the sixth attendee as sixth input 504F with time stamp of 11:37AM. For the illustrated embodiment, the first input 504A, the second input 504B, the third input 504C, the fourth input 504D, the fifth input 504E and the sixth input 504F may be collected to be the one or more inputs 214. When synching the live content with the one or more inputs 214, the context of the live content is mapped with context of the one or more inputs 214. Consider at 11:30AM, the presented comments saying "WE HAVE A PROFIT OF 20%" which is part of the live content. From the comment, it may be derived that the context of the live content at 11:30AM is related to profit. Context of the first input 504A may not be related to the context at 11:30AM of the live content. The first input 504A may be embedded when replaying frame 502A. Further, time stamp of the second input 504B, the third input 504C, the fourth input 504D and the fifth input 504E is same as the time stamp of live content at 11:30AM. Also, the context of the live content at 11:30AM is similar to the context of the second input 504B, the third input 504C, the fourth input 504D and the fifth input 504E. Thus, the second input 504B, the third input 504C, the fourth input 504D and the fifth input 504E may be embedded replay of frame 502B that is illustrated as frame 600 in FIG. 6. The sixth input 504F which is collected at 11:37AM may have a context which is matching with context of live content at 11:30AM. Thus, the frame 600 may also include the sixth input as shown in FIG. 6.

In some non-limiting embodiments or aspects, the processing unit 102 may receive data for rendering data in the content rendering environment via the I/O interface 114. The received data may include, but is not limited to, at least one of the live content data 212, the input data 214, and the like. Also, the processing unit 102 may transmit data for rendering data in the content rendering environment via the I/O interface 114. The transmitted data may include, but is not limited to, the synchronized content data 216, and the like.

Figure 7:
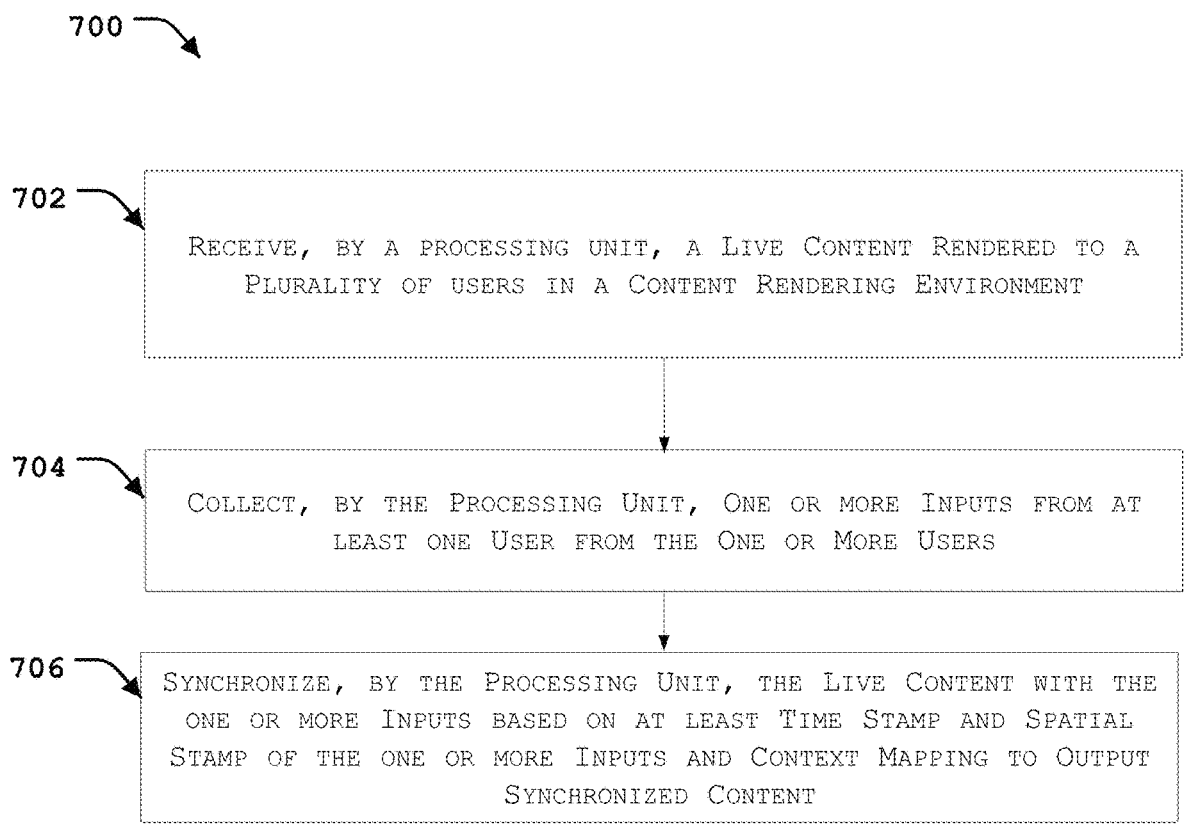
FIG. 7 is an exemplary process of processing unit for creating and rendering synchronized content for a content rendering environment, in accordance with an embodiment of the present disclosure.

The other data 218 may comprise data, including temporary data and temporary files, generated by modules for performing the various functions of the processing unit 102. The one or more modules may also include other modules 210 to perform various miscellaneous functionalities of the processing unit 102. It will be appreciated that such modules may be represented as a single module or a combination of different modules FIG. 7 shows an exemplary process of a processing unit for creating and rendering the synchronized content for the content rendering environment, in accordance with an embodiment of the present disclosure. Process 700 for creating and rendering the synchronized content includes steps coded in form of executable instructions to be executed by a processing unit associated with user devices connected with the content rendering environment. At block 702, the processing unit is configured to receive a live content rendered to at least one user in a content rendering environment.

At block 704, the processing unit is configured to collect one or more inputs from a first user of the at least one user, and optionally from one or more second users of the at least one user, during rendering of the live content. The one or more inputs comprises user inputs provided in at least one of a virtual environment and user actions in a real-world environment. The one or more inputs are collected along with at least one of corresponding time stamp and corresponding spatial stamp in the content rendering environment.

At block 706, the processing unit is configured to synchronize the live content with the one or more inputs based on at least one of the time stamp and the spatial stamp of the one or more inputs, and context mapping of the one or more inputs with segments of the live content to output a synchronized content.

Figure 8:
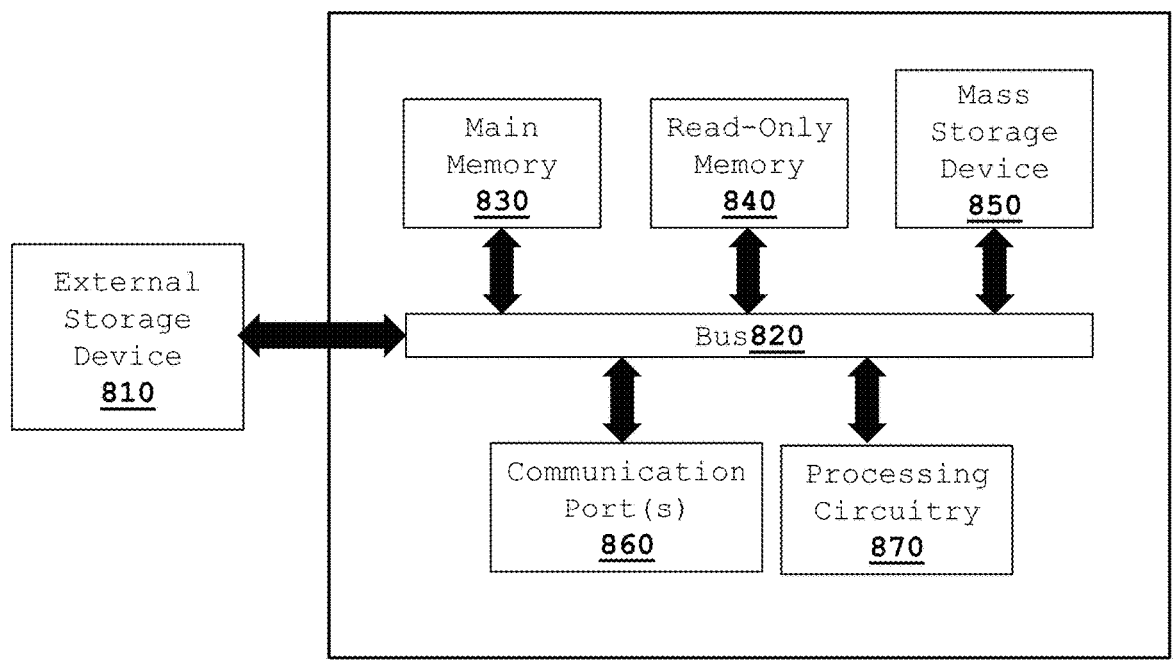
FIG. 8 illustrates an exemplary computer unit in which or with which embodiments of the present invention may be utilized.

FIG. 8 illustrates an exemplary computer system in which or with which embodiments of the present invention may be utilized. Depending upon the particular implementation, the various process and decision blocks described above may be performed by hardware components, embodied in machine-executable instructions, which may be used to cause a general-purpose or special-purpose processor programmed with the instructions to perform the steps, or the steps may be performed by a combination of hardware, software and/or firmware . As shown in FIG. 8, the computer system 800 includes an external storage device 810, bus 820, main memory 830, read-only memory 840, mass storage device 850, communication port(s) 860, and processing circuitry 870.

Those skilled in the art will appreciate that the computer system 800 may include more than one processing circuitry 870 and one or more communication ports 860. The processing circuitry 870 should be understood to mean circuitry based on one or more microprocessors, microcontrollers, digital signal processors, programmable logic devices, Field-Programmable Gate Arrays (FPGAs), Application-Specific Integrated Circuits (ASICs), etc., and may include a multi-core processor (e.g., dual-core, quadcore, Hexa-core, or any suitable number of cores) or supercomputer. In some embodiments, the processing circuitry 870 is distributed across multiple separate processors or processing units, for example, multiple of the same type of processing units (e.g., two Intel Core i7 processors) or multiple different processors (e.g., an Intel Core i5 processor and an Intel Core i7 processor).

Examples of the processing circuitry 870 include, but are not limited to, an Intel® Itanium® or Itanium 2 processor(s), or AMD® Opteron® or Athlon MP® processor(s), Motorola® lines of processors, System on Chip (SoC) processors or other future processors. The processing circuitry 870 may include various modules associated with embodiments of the present disclosure.

The communication port 860 may include a cable modem, Integrated Services Digital Network (ISDN) modem, a Digital Subscriber Line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of electronic devices or communication of electronic devices in locations remote from each other. The communication port 860 may be any RS-232 port for use with a modem-based dialup connection, a 10/100 Ethernet port, a Gigabit, or a 10 Gigabit port using copper or fiber, a serial port, a parallel port, or other existing or future ports. The communication port 860 may be chosen depending on a network, such as a Local Area Network (LAN), Wide Area Network (WAN), or any network to which the computer system 800 may be connected.

The main memory 830 may include Random Access Memory (RAM) or any other dynamic storage device commonly known in the art. Read-only memory (ROM) 840 may be any static storage device(s), e.g., but not limited to, a Programmable Read-Only Memory (PROM) chips for storing static information, e.g., start-up or BIOS instructions for the processing circuitry 870.

The mass storage device 850 may be an electronic storage device. As referred to herein, the phrase "electronic storage device" or "storage device" should be understood to mean any device for storing electronic data, computer software, or firmware, such as random-access memory, read-only memory, hard drives, optical drives, Digital Video Disc (DVD) recorders, Compact Disc (CD) recorders, BLU-RAY disc (BD) recorders, BLU-RAY 3D disc recorders, Digital Video Recorders (DVRs, sometimes called a personal video recorder or PVRs), solid-state devices, quantum storage devices, gaming consoles, gaming media, or any other suitable fixed or removable storage devices, and/or any combination of the same. Nonvolatile memory may also be used (e.g., to launch a boot-up routine and other instructions). Cloud-based storage may be used to supplement the main memory 830. The mass storage device 850 may be any current or future mass storage solution, which may be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firmware interfaces), e.g., those available from Seagate (e.g., the Seagate Barracuda 7200 family) or Hitachi (e.g., the Hitachi Deskstar 7K1000), one or more optical discs, Redundant Array of Independent Disks (RAID) storage, e.g., an array of disks (e.g., SATA arrays), available from various vendors including Dot Hill Systems Corp., LaCie, Nexsan Technologies, Inc. and Enhance Technology, Inc.

The bus 820 communicatively couples the processing circuitry 870 with the other memory, storage, and communication blocks. The bus 820 may be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processing circuitry 870 to the software system.

Optionally, operator and administrative interfaces, e.g., a display, keyboard, and a cursor control device, may also be coupled to the bus 820 to support direct operator interaction with the computer system 800. Other operator and administrative interfaces may be provided through network connections connected through the communication port(s) 860. The external storage device 810 may be any kind of external hard drives, floppy drives, IOMEGA® Zip Drives, Compact Disc - Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

The computer system 800 may be accessed through a user interface. The user interface application may be implemented using any suitable architecture. For example, it may be a stand-alone application wholly implemented on the computer system 800. The user interfaces application and/or any instructions for performing any of the embodiments discussed herein may be encoded on computer-readable media. Computer-readable media includes any media capable of storing data. In some embodiments, the user interface application is a client-server-based application. Data for use by a thick or thin client implemented on electronic device computer system 800 is retrieved on-demand by issuing requests to a server remote to the computer system 800. For example, computer system 800 may receive inputs from the user via an input interface and transmit those inputs to the remote server for processing and generating the corresponding outputs. The generated output is then transmitted to the computer system 800 for presentation to the user.

While embodiments of the present invention have been illustrated and described, it will be clear that the invention is not limited to these embodiments only. Numerous modifications, changes, variations, substitutions, and equivalents, will be apparent to those skilled in the art without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document, terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded to the widest scope consistent with the principles and novel features disclosed herein. It is contemplated that additional embodiments are within the spirit and true scope of the disclosed subject matter.

We claim:

1. A method for creating and rendering synchronized content for a content rendering environment, the method comprising:
   receiving, by a processing unit, a live content rendered to at least one user in the content rendering environment;
   collecting, by the processing unit, one or more inputs from a first user of the at least one user, and optionally from one or more second users of the at least one user, during rendering of the live content, wherein the one or more inputs comprises user inputs provided in at least one of a virtual environment and user actions in a real-world environment, wherein the one or more inputs are collected along with at least one of corresponding time stamp and corresponding spatial stamp in the content rendering environment; and
   synchronizing, by the processing unit, the live content with the one or more inputs based on at least one of the corresponding time stamp, the corresponding spatial stamp of the one or more inputs, and context mapping of the one or more inputs with segments of the live content to output the synchronized content, wherein synchronizing the live content with the one or more inputs comprises:
   identifying matching inputs from the one or more inputs, wherein the matching inputs are associated with at least one of similar time stamp, similar spatial stamp, similar context, and similar content;
   correlating the matching inputs based on the similar context and the similar content;
   modifying the matching inputs based on the correlation, to output a modified input; and
   synchronizing the live content with the modified input to output the synchronized content.

2. The method of claim 1 further comprising rendering, by the processing unit, when a replay mode of the live content is selected by the at least one user, the synchronized content to the at least one user.

3. The method of claim 1, wherein correlating the matching inputs comprises, at least one of:
   identifying missing content in an input from the matching inputs; and
   identifying the matching inputs to be same.

4. The method of claim 3, wherein modifying the matching inputs based on the correlation comprises, at least one of:
   combining contents of the matching inputs to include non-repetitive content in the modified input; and
   altering at least one of the corresponding time stamp and the corresponding spatial stamp of the modified input, to synchronize the modified input with the live content.

5. The method of claim 1, wherein the synchronized content comprises a plurality of layers, wherein a first layer of the plurality of layers comprises the live content, wherein each of other layers from the plurality of layers comprises at least one input from the one or more inputs.

6. The method of claim 5, further comprising, providing, by the processing unit, an option to the at least one user of the at least one user to select at least one of the other layers, prior to rendering the synchronized content to the at least one user.

7. The method of claim 1, wherein the one or more inputs comprises at least one of voice inputs, text inputs, image inputs and video inputs.

8. A processing unit for creating and rendering synchronized content for a content rendering environment, the processing unit comprises:
one or more processors; and
a memory communicatively coupled to the one or more processors, wherein the memory stores processor-executable instructions, which, on execution, cause the one or more processors to:
receive a live content rendered to at least one user in the content rendering environment;
collect one or more inputs from a first user of the at least one user, and optionally from one or more second users of the at least one user, during rendering of the live content, wherein the one or more inputs comprises user inputs provided in at least one of a virtual environment and user actions in a real-world environment, wherein the one or more inputs are collected along with at least one of corresponding time stamp and corresponding spatial stamp in the content rendering environment; and
synchronize the live content with the one or more inputs based on at least one of the corresponding time stamp, the corresponding spatial stamp of the one or more inputs, and context mapping of the one or more inputs with segments of the live content to output the synchronized content, wherein synchronizing the live content with the one or more inputs comprises:
identifying matching inputs from the one or more inputs, wherein the matching inputs are associated with at least one of similar time stamp, similar spatial stamp, similar context, and similar content;
correlating the matching inputs based on the similar context and the similar content;
modifying the matching inputs based on the correlation, to output a modified input; and
synchronizing the live content with the modified input to output the synchronized content.

9. The processing unit of claim 8 further comprises the one or more processors configured to render, when a replay mode of the live content is selected by the at least one user, the synchronized content to the at least one user.

10. The processing unit of claim 8, wherein the one or more processors are configured to correlate the matching inputs comprises, at least one of:
identifying missing content in an input from the matching inputs; and
identifying the matching inputs to be same.

11. The processing unit of claim 10, wherein the one or more processors are configured to modify the matching inputs based on the correlation comprises, at least one of:
combining contents of the matching inputs to include non-repetitive content in the modified input; and
altering at least one of the corresponding time stamp and the corresponding spatial stamp of the modified input, to synchronize the modified input with the live content.

12. The processing unit of claim 8, wherein the synchronized content comprises a plurality of layers, wherein a first layer of the plurality of layers comprises the live content, wherein each of other layers from the plurality of layers comprises at least one input from the one or more inputs.

13. The processing unit of claim 12, further comprises, providing, by the processing unit, an option to the at least one user to select at least one of the other layers, prior to rendering the synchronized content to the at least one user.

14. The processing unit of claim 8, wherein the one or more inputs comprises at least one of voice inputs, text inputs, image inputs and video inputs.

15. A non-transitory computer-readable medium including instructions stored thereon that when processed by one or more processors cause a processing unit to perform operations comprising:
receiving a live content rendered to at least one user in a content rendering environment;
collecting one or more inputs from a first user of the at least one user, and optionally from one or more second users of the at least one user, during rendering of the live content, wherein the one or more inputs comprises user inputs provided in at least one of a virtual environment and user actions in a real-world environment, wherein the one or more inputs are collected along with at least one of corresponding time stamp and corresponding spatial stamp in the content rendering environment; and
synchronizing the live content with the one or more inputs based on at least one of the corresponding time stamp and the corresponding spatial stamp of the one or more inputs, and context mapping of the one or more inputs with segments of the live content to output a synchronized content, wherein synchronizing the live content with the one or more inputs comprises:
identifying matching inputs from the one or more inputs, wherein the matching inputs are associated with at least one of similar time stamp, similar spatial stamp, similar context, and similar content;
correlating the matching inputs based on the similar context and the similar content;
modifying the matching inputs based on the correlation, to output a modified input; and
synchronizing the live content with the modified input to output the synchronized content.

16. The non-transitory computer-readable medium of claim 15 further comprising rendering when a replay mode of the live content is selected by the at least one user, the synchronized content to the at least one user.

17. The non-transitory computer-readable medium of claim 15, wherein correlating the matching inputs comprises, at least one of:
identifying missing content in an input from the matching inputs; and
identifying the matching inputs to be same, wherein modifying the matching inputs based on the correlation comprises, at least one of:
combining contents of the matching inputs to include non-repetitive content in the modified input; and
altering at least one of the corresponding time stamp and the corresponding spatial stamp of the modified input, to synchronize the modified input with the live content.

18. The non-transitory computer-readable medium of claim 15, wherein the synchronized content comprises a plurality of layers, wherein a first layer of the plurality of layers comprises the live content, wherein each of other layers from the plurality of layers comprises at least one input from the one or more inputs,
wherein the method, further comprises, providing, by the processing unit, an option to the at least one user to select at least one of the other layers, prior to rendering the synchronized content to the at least one user.

* * * * *